United States Patent
Duggan (10) Patent No.: US 6,601,910 B1
(45) Date of Patent: Aug. 5, 2003

(54) EXPANDABLE RAM SYSTEM

(76) Inventor: Kevin G. Duggan, 4640 Guava Ct., Sarsota, FL (US) 34234

( * ) Notice: Subject to any disclaimer, the term of this patent is extended or adjusted under 35 U.S.C. 154(b) by 0 days.

(21) Appl. No.: 10/159,058

(22) Filed: May 31, 2002

(51) Int. Cl.[7] .................................................. B60J 7/00
(52) U.S. Cl. .............................. 296/203.03; 296/146.6; 296/203.61
(58) Field of Search ...................... 296/205.03, 203.01, 296/146.8, 146.9, 201, 155, 188, 204, 146.6, 146.5, 185, 189; 49/502, 374

(56) References Cited

U.S. PATENT DOCUMENTS

| | | | | |
|---|---|---|---|---|
| 4,013,317 A | * | 3/1977 | Reidelbach et al. | 296/146.6 |
| 4,428,599 A | * | 1/1984 | Jahnle | 296/203.01 |
| D289,277 S | * | 4/1987 | Horberg et al. | |
| 4,917,433 A | * | 4/1990 | Tomforde | |
| 5,224,752 A | * | 7/1993 | Marshall | 296/146.6 |
| 5,417,470 A | * | 5/1995 | Holt | 296/146.6 |
| 5,431,476 A | * | 7/1995 | Torigaki | 296/146.6 |
| 5,688,021 A | * | 11/1997 | Tomforde et al. | 296/203.01 |
| 5,800,007 A | * | 9/1998 | Cho | 296/146.6 |
| 5,806,917 A | * | 9/1998 | Townsend | 296/146.6 |
| 5,908,216 A | * | 6/1999 | Townsend | |
| 5,964,487 A | * | 10/1999 | Shamblin | 292/144 |
| 6,053,565 A | * | 4/2000 | Cho | 296/146.6 |
| 6,092,865 A | * | 7/2000 | Jaekel et al. | 296/203.04 |
| 6,123,378 A | * | 9/2000 | Teply et al. | 296/203.01 |
| 6,220,652 B1 | * | 4/2001 | Browne et al. | 296/146.6 |
| 6,250,410 B1 | * | 6/2001 | Balestrini et al. | 180/65.5 |
| 6,302,478 B1 | * | 10/2001 | Jaekel et al. | 296/203.04 |
| 6,332,641 B1 | * | 12/2001 | Okana | 296/146.6 |
| 6,371,767 B1 | * | 4/2002 | Libby | 296/205 |
| 6,382,707 B1 | * | 5/2002 | Dunneback | 296/146.6 |
| 6,450,565 B2 | * | 9/2002 | Yamamoto | 296/146.6 |
| 2001/0017476 A1 | * | 8/2001 | Nishikawa et al. | 296/146.5 |
| 2002/0073625 A1 | * | 6/2002 | Jennings | 296/146.6 |
| 2002/0093219 A1 | * | 7/2002 | Traister et al. | 296/146.6 |
| 2002/0180244 A1 | * | 12/2002 | Kosuge et al. | 296/204 |
| 2003/0006625 A1 | * | 1/2003 | Moriyama et al. | 296/146.6 |

* cited by examiner

*Primary Examiner*—Kiran Patel (57) ABSTRACT

A expandable ram system for providing additional rigidity to a body of a vehicle. The expandable ram system includes a front frame member being designed for being coupled to a front of a body whereby the front frame member is for stiffening the front of the body of the vehicle. A rear frame member is designed for being coupled to a rear of the body whereby the rear frame member is for stiffening the rear of the body of the vehicle. A plurality of door frame assemblies are selectively coupled to the front frame member and the rear frame member. Each of the door frame assemblies is designed for being positioned in one of plurality of doors of the body. The door frame assemblies rigidly connect the front frame member to the rear frame member for preventing flex in the body of the vehicle when the doors of the vehicle are closed.

16 Claims, 9 Drawing Sheets

EXPANDABLE RAM SYSTEM

BACKGROUND OF THE INVENTION

1. Field of the Invention

The present invention relates to integrated motor vehicle door and chassis and more particularly pertains to a new expandable ram system for providing additional rigidity to a body of a vehicle.

2. Description of the Prior Art

The use of integrated motor vehicle door and chassis is known in the prior art. U.S. Pat. No. 5,806,917 describes a system for incorporating the door of the vehicle into the chassis of the vehicle for making the door a structural part of the chassis. Another type of integrated motor vehicle door and chassis is U.S. Pat. No. 5,224,752 having a tie bar positioned in the door of the vehicle for integrating the door into the chassis of the vehicle when the door is closed. U.S. Pat. No. 5,964,487 has a mechanism for maintaining the door of the vehicle in a latched position even when electricity has been cut by involvement of the vehicle in an accident. U.S. Pat. No. 4,917,433 has a multi-shell door body for inhibiting encroachment into the passenger compartment during a collision. U.S. Pat. No. 5,908,216 has a side intrusion beam positioned within the door with four points of connection to the chassis the integrate the door into the chassis of the vehicle when the door is closed.

While these devices fulfill their respective, particular objectives and requirements, the need remains for a system that has certain improved features provides added rigidity to the body of a vehicle that lacks a rigid roof, such as a convertible.

SUMMARY OF THE INVENTION

The present invention meets the needs presented above by providing a front frame member and a rear frame member connected through the door assemblies positioned in the doors to provide rigidity to the body of the vehicle.

Still yet another object of the present invention is to provide a new expandable ram system that provides a front frame member and a rear frame member to stiffen the front and rear of the body of the vehicle respectively.

Even still another object of the present invention is to provide a new expandable ram system that has door assemblies for rigidly coupling the front frame member to the rear frame member.

To this end, the present invention generally comprises a front frame member being designed for being coupled to a front of a body of the vehicle. The front frame member is designed for being positioned above a base frame of the vehicle whereby the front frame member is for stiffening the front of the body of the vehicle. A rear frame member is designed for being coupled to a rear of the body of the vehicle. The rear frame member is designed for being positioned above the base frame of the vehicle whereby the rear frame member is for stiffening the rear of the body of the vehicle. A plurality of door frame assemblies are selectively coupled to the front frame member and the rear frame member. Each of the door frame assemblies is designed for being positioned in one of plurality of doors of the body of the vehicle. The door frame assemblies rigidly connect the front frame member to the rear frame member for preventing flex in the body of the vehicle when the doors of the vehicle are closed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
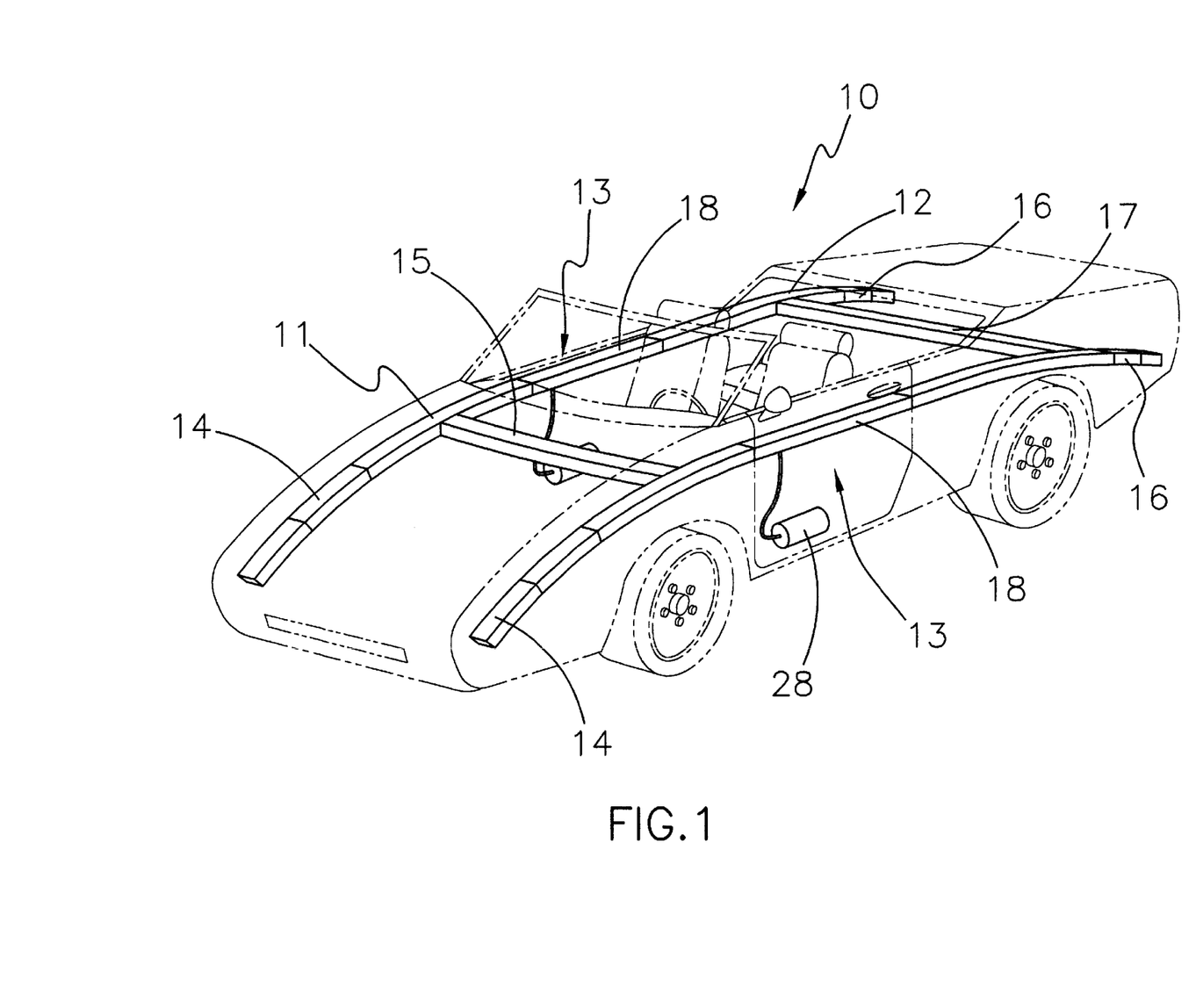
FIG. 1 is a perspective view of a new expandable ram system according to the present invention in use.
Figure 2:
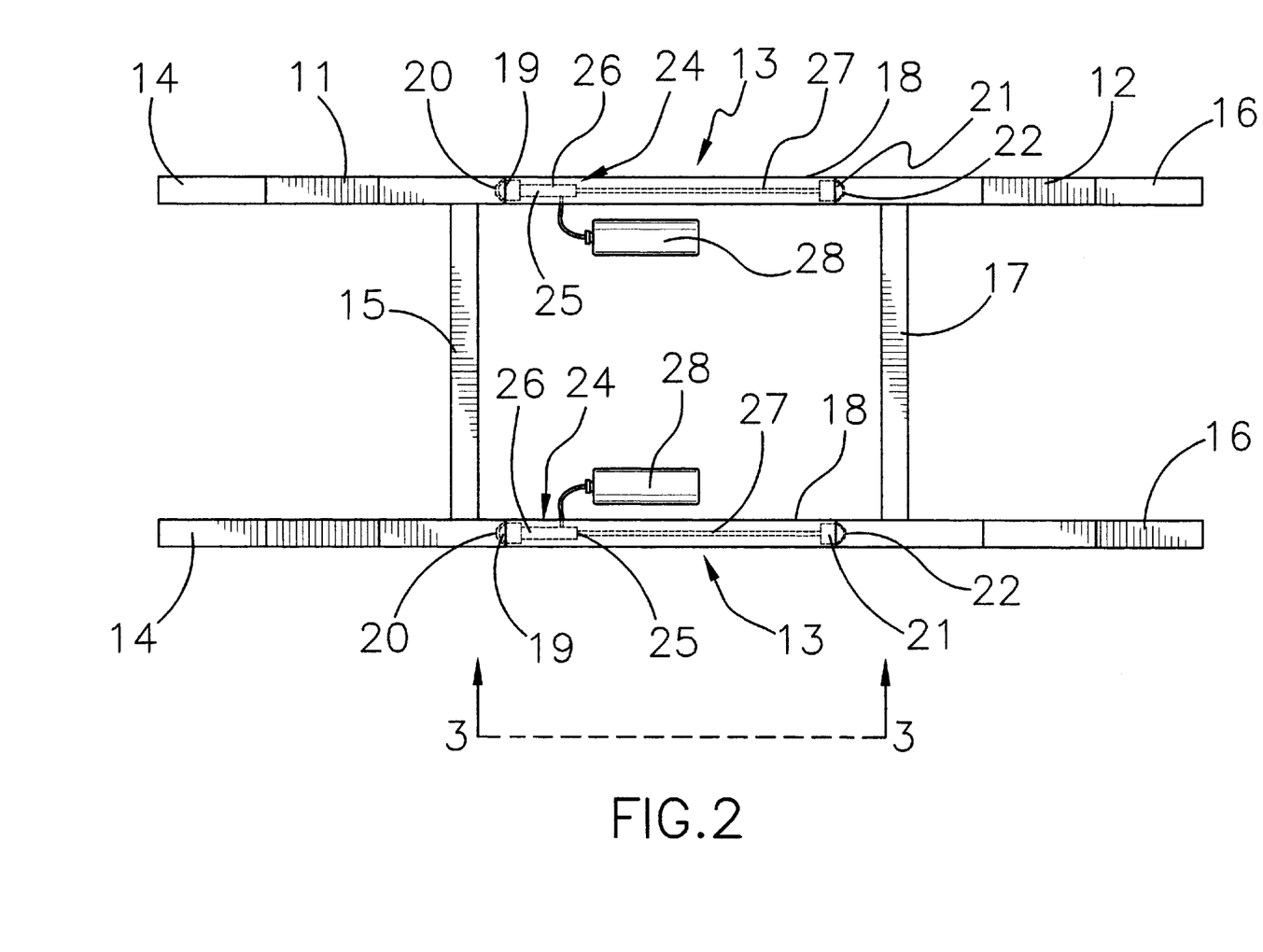
FIG. 2 is a top view of the present invention.
Figure 3:
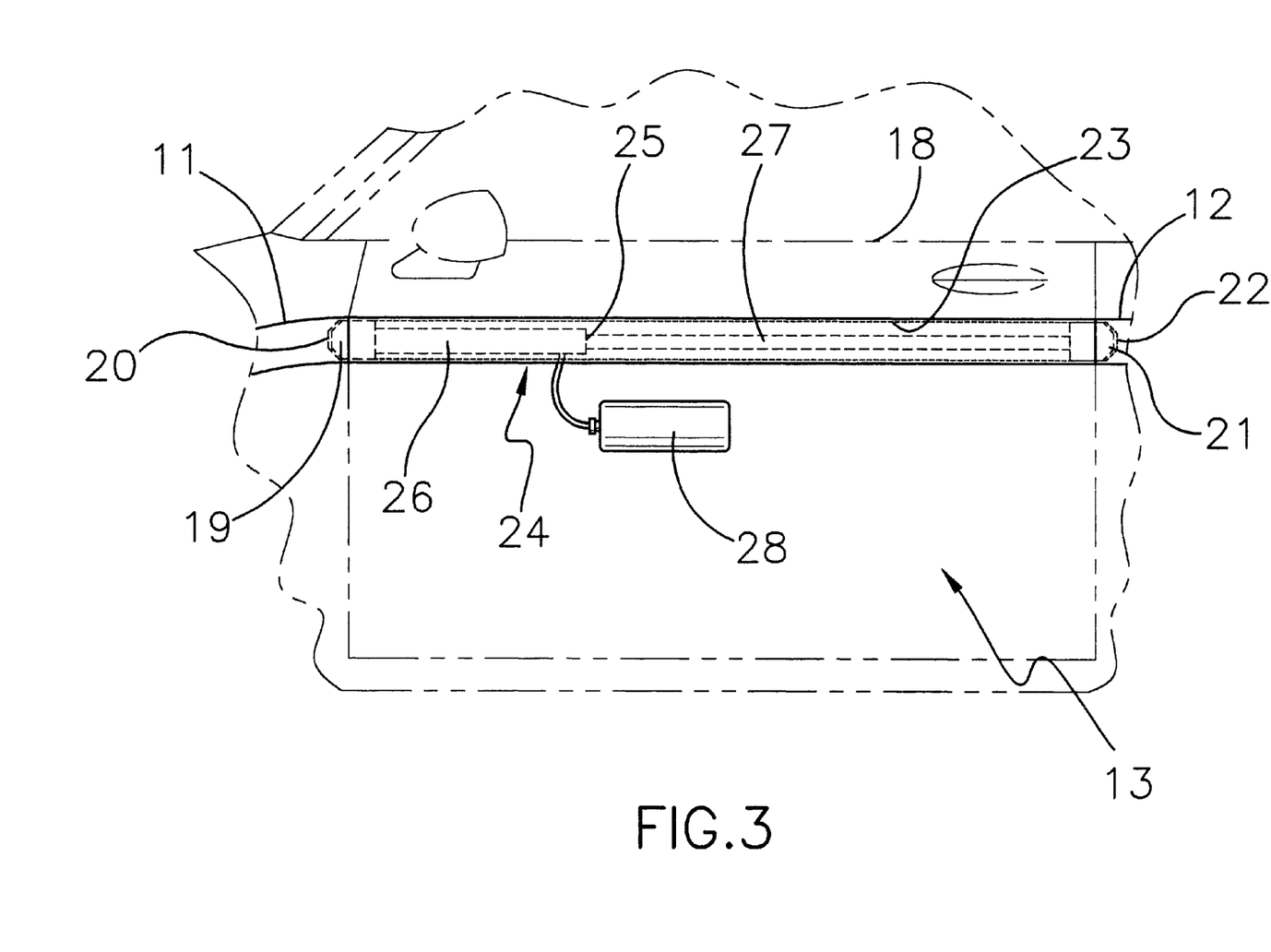
FIG. 3 is a side view of the present invention with the front insert member and rear insert member in an extended position.
Figure 4:
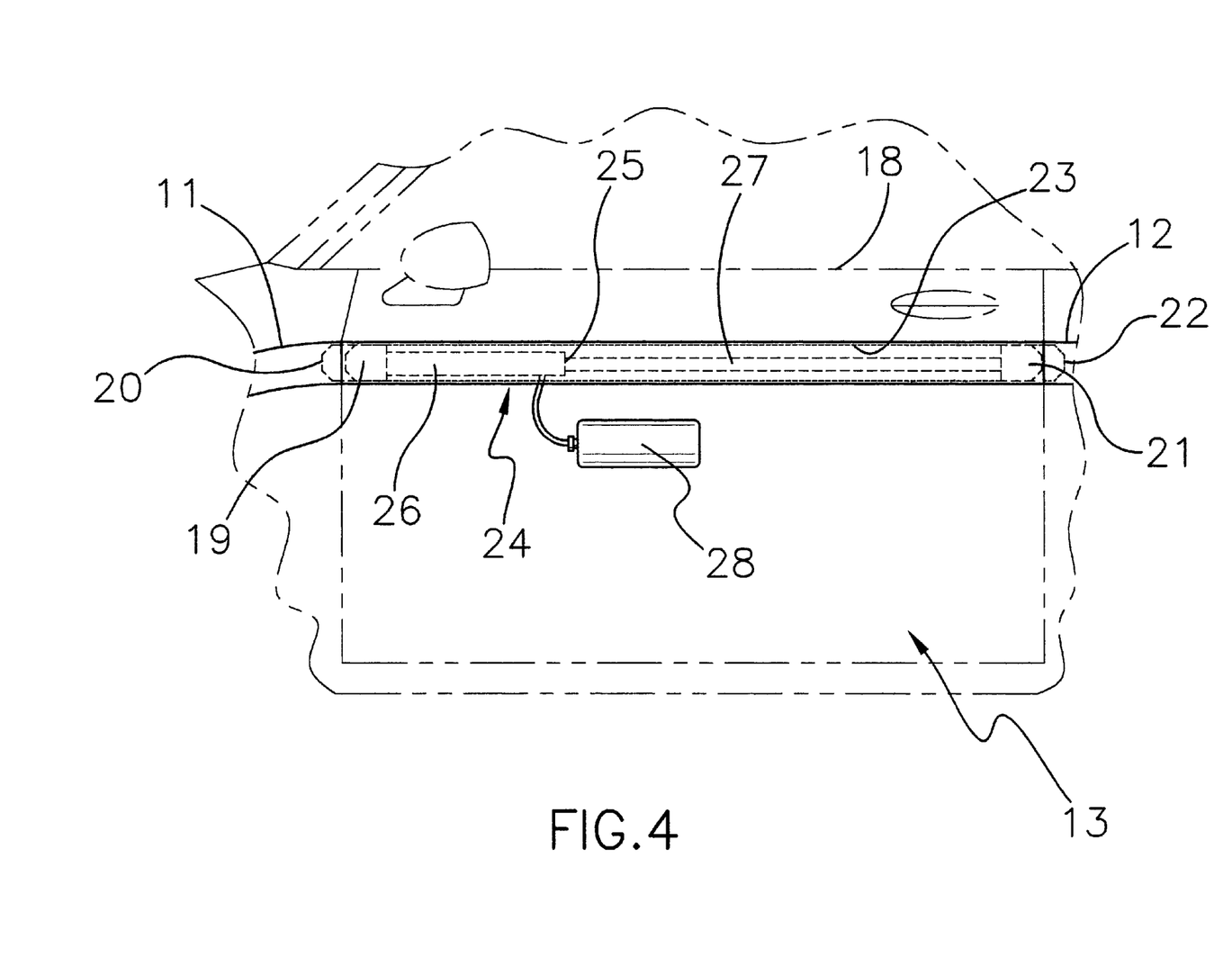
FIG. 4 is a side view of the present invention with the front insert member and rear insert member in an retracted position.
Figure 5:
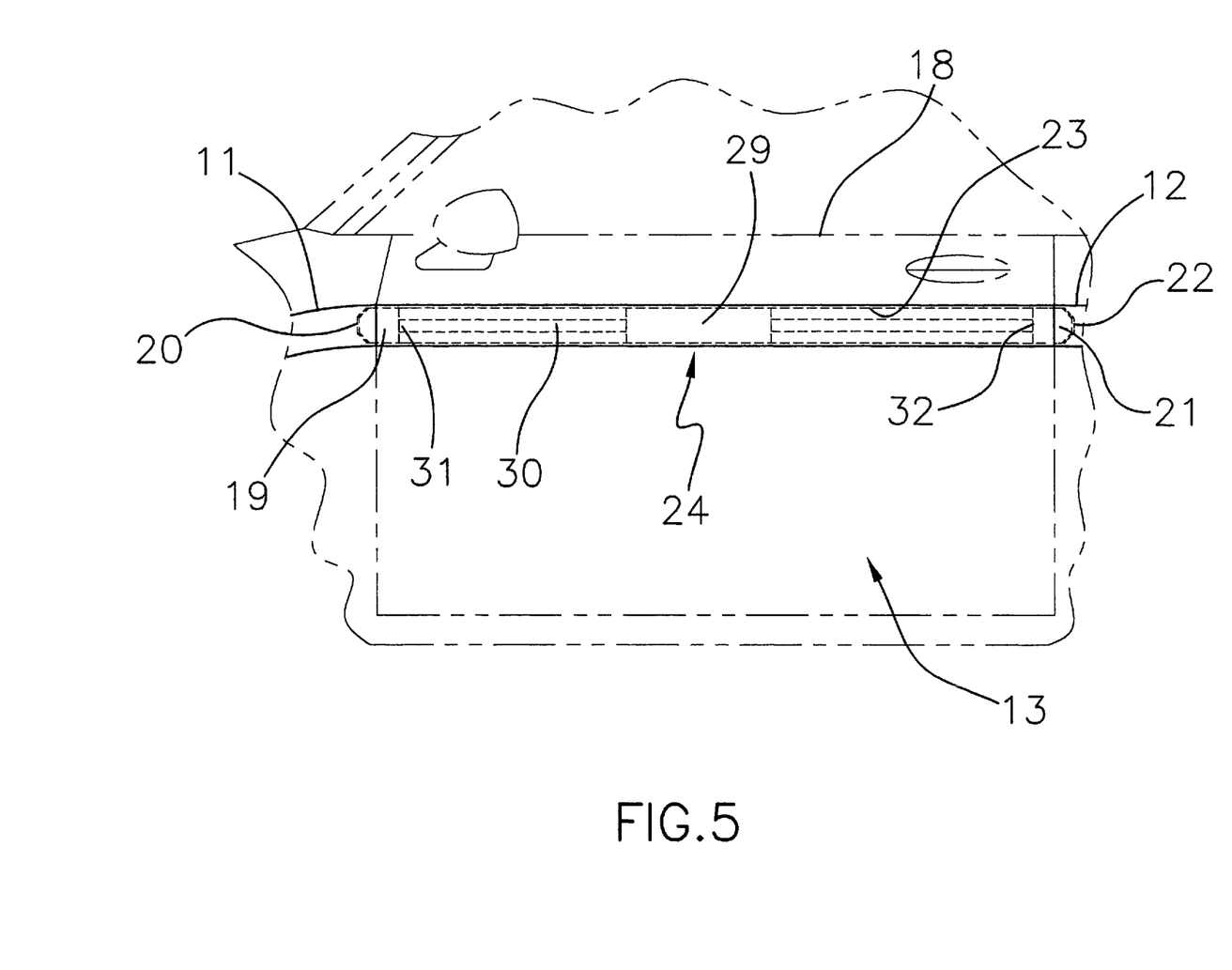
FIG. 5 is a side view of an alternate embodiment of the actuation assembly of the present invention with the front insert member and rear insert member in an extended position.
Figure 6:
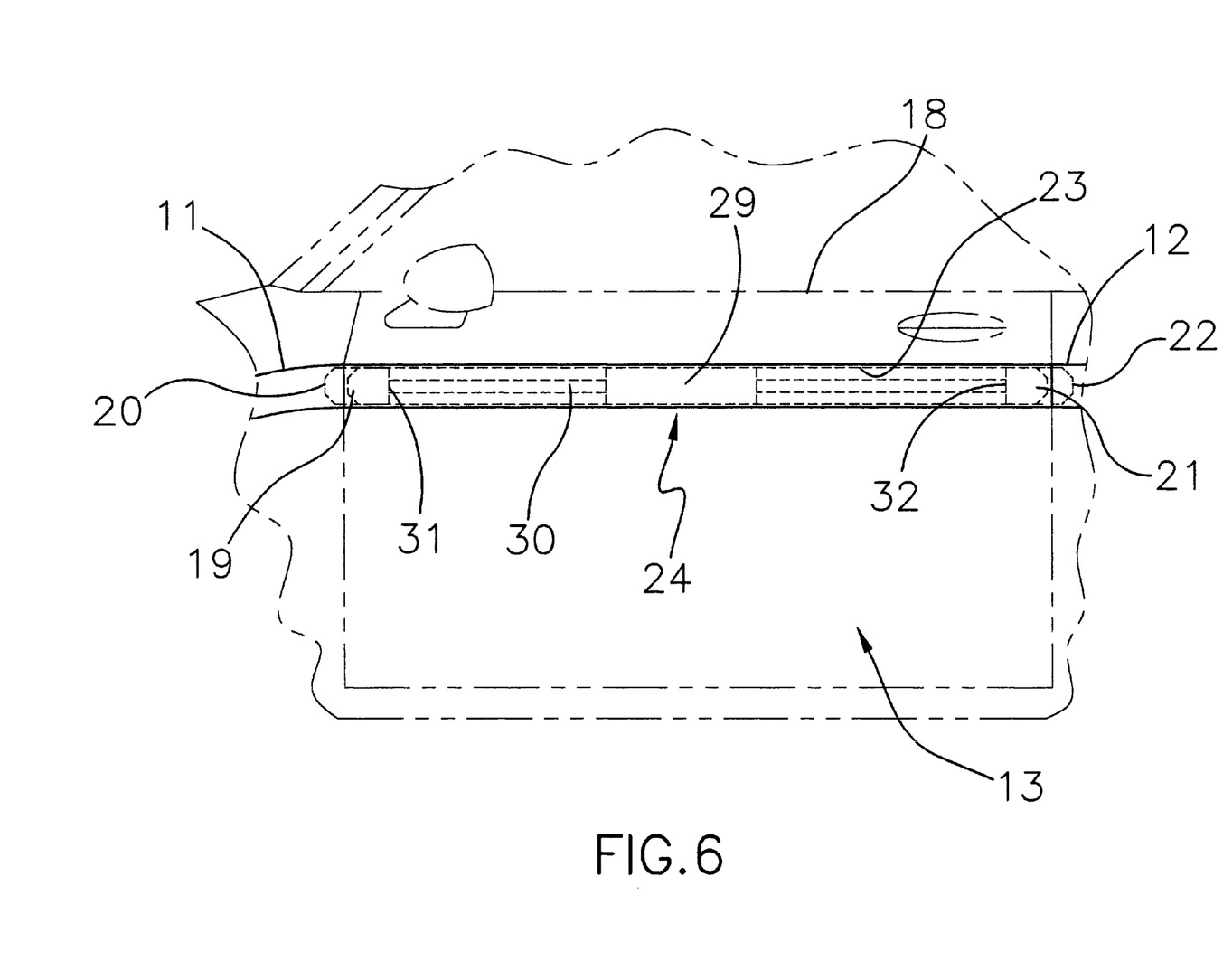
FIG. 6 is a side view of the embodiment of the actuation assembly of the present invention with the front insert member and rear insert member in an extended position.
Figure 7:
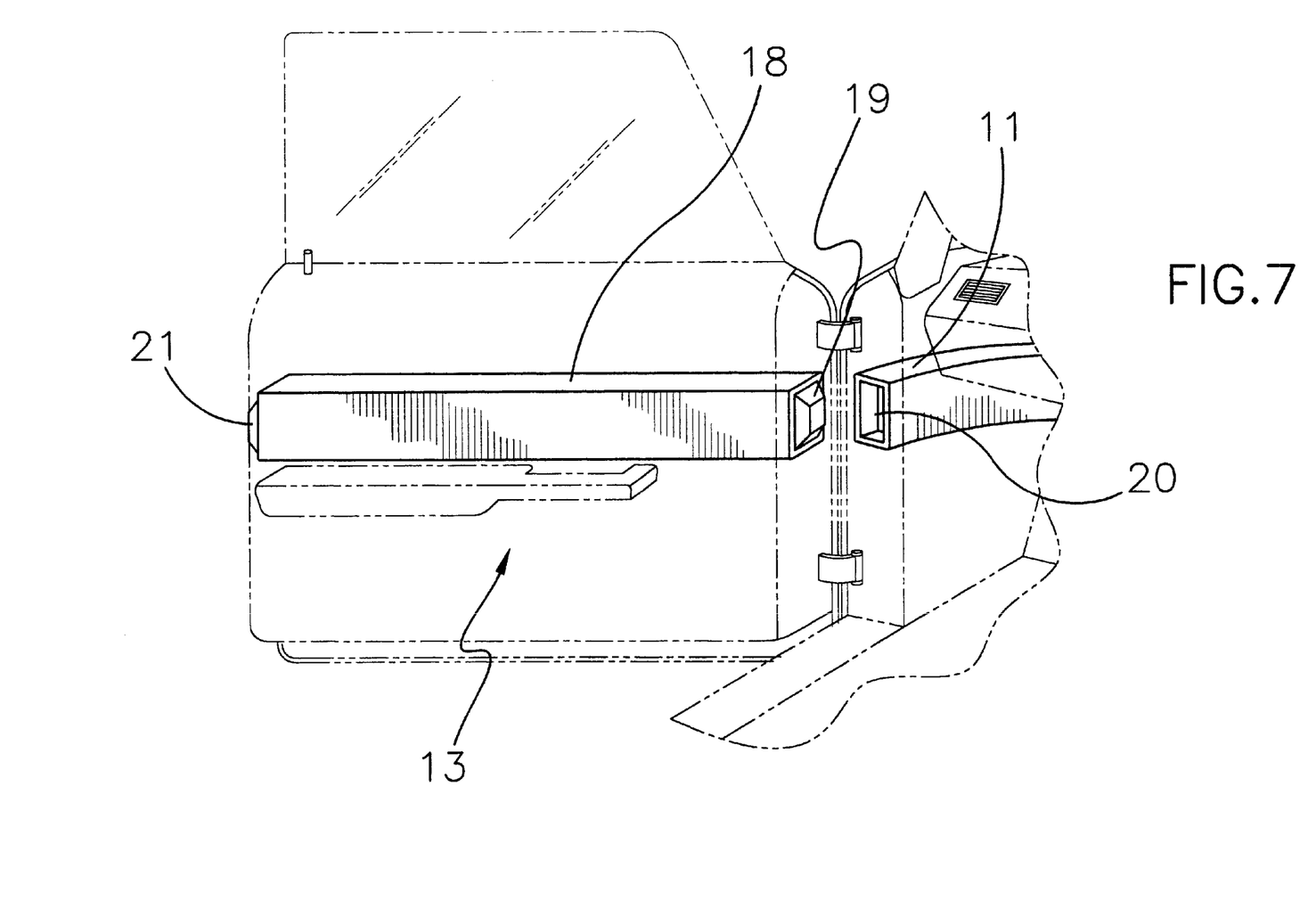
FIG. 7 is a perspective view of the present invention showing the door of the vehicle in an open position.
Figure 8:
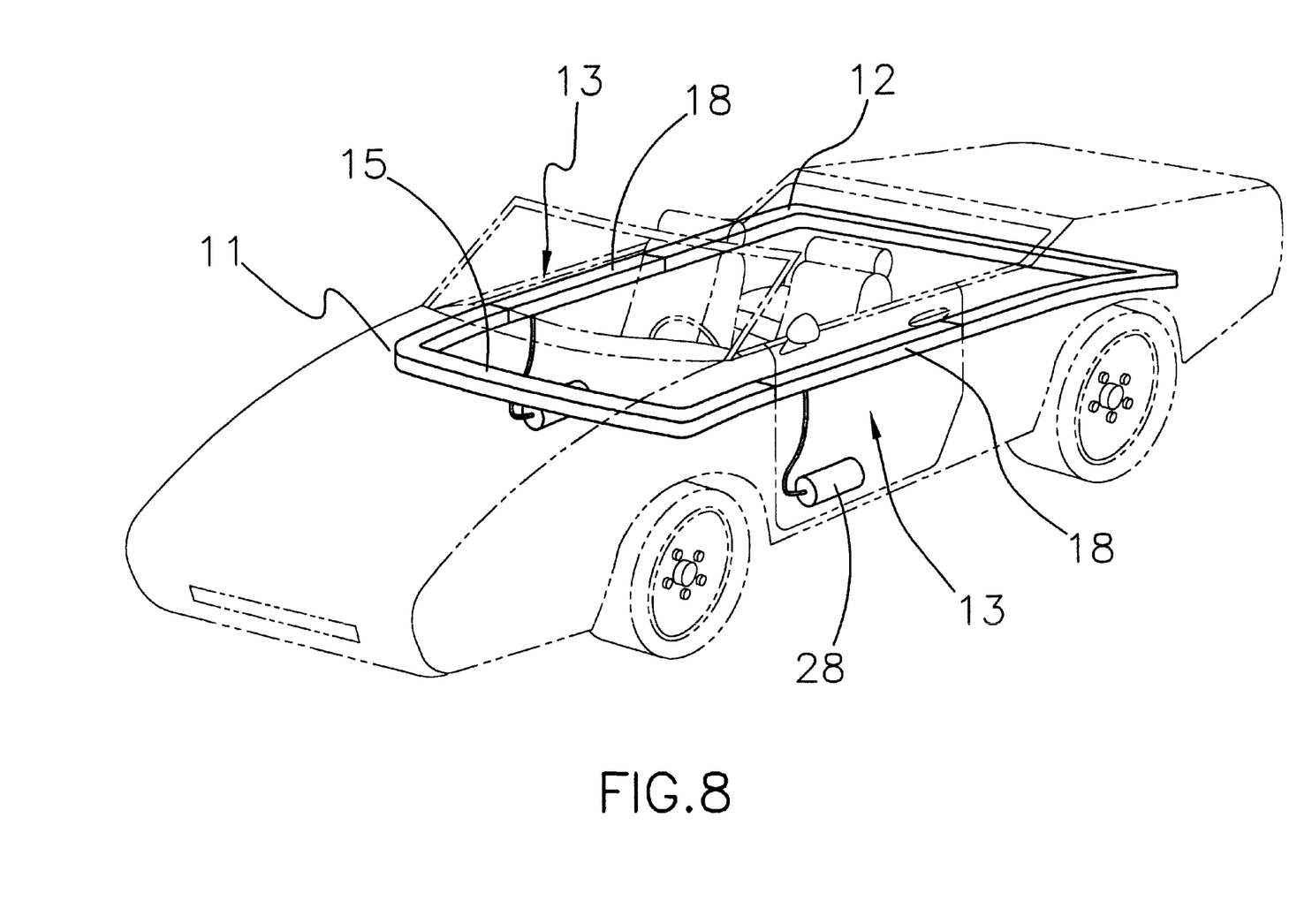
FIG. 8 is a perspective view of an embodiment of the front frame member and rear frame member of the present invention.
Figure 9:
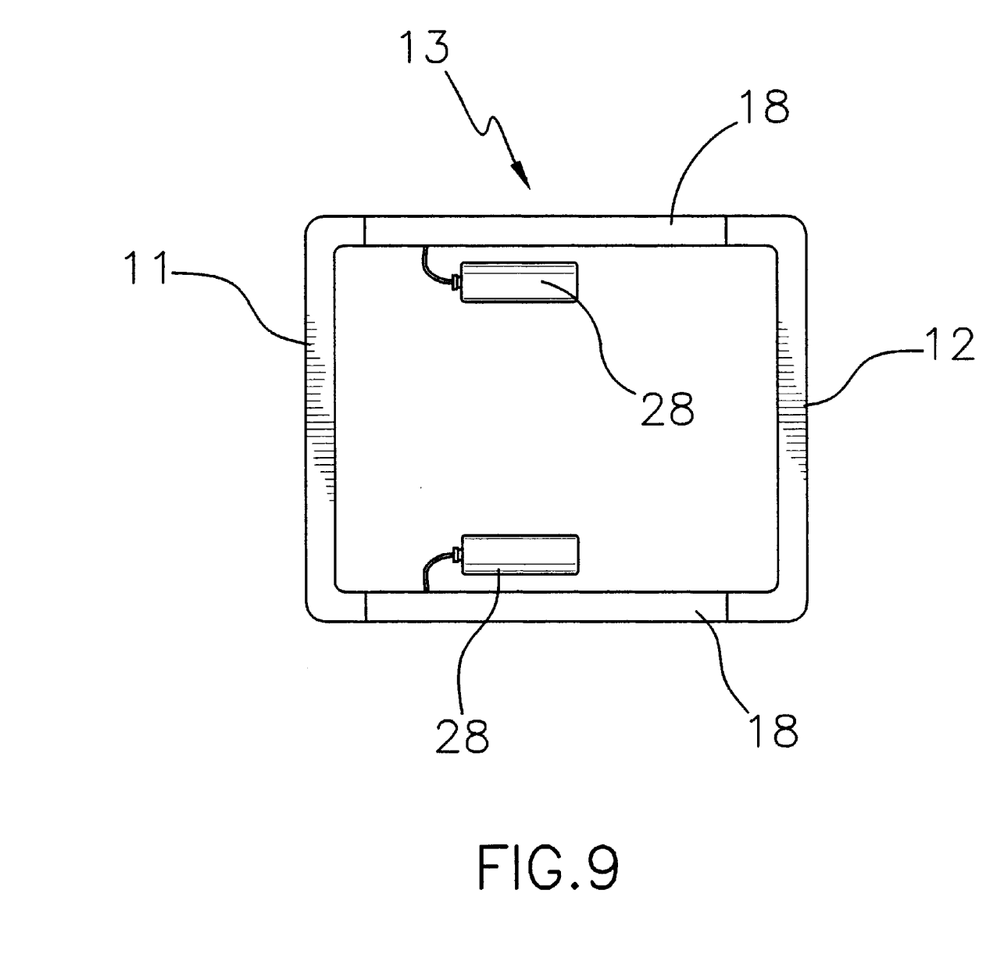
FIG. 9 is a top view of the embodiment of the front frame member and the rear frame member of the present invention as shown in FIG. 8.

With reference now to the drawings, and in particular to FIGS. 1 through 9 thereof, a new expandable ram system embodying the principles and concepts of the present invention and generally designated by the reference numeral 10 will be described.

As best illustrated in FIGS. 1 through 9, the expandable ram system 10 generally comprises a front frame member 11 being designed for being coupled to a front of a body of the vehicle. The front frame member 11 is designed for being positioned above a base frame of the vehicle whereby the front frame member 11 is for stiffening the front of the body of the vehicle.

A rear frame member 12 is designed for being coupled to a rear of the body of the vehicle. The rear frame member 12 is designed for being positioned above the base frame of the vehicle whereby the rear frame member 12 is for stiffening the rear of the body of the vehicle.

A plurality of door frame assemblies 13 are selectively coupled to the front frame member 11 and the rear frame member 12. Each of the door frame assemblies 13 is designed for being positioned in one of plurality of doors of the body of the vehicle. The door frame assemblies 13 rigidly connect the front frame member 11 to the rear frame member 12 for preventing flex in the body of the vehicle when the doors of the vehicle are closed.

The front frame member 11 has a pair of front arm portions 14. Each of the front arm portions 14 is selectively coupled to one of the door frame assemblies 13. Each of the front arm portions 14 is designed for extending along a fender of the body of the vehicle whereby the arm portions are for inhibiting twisting of the front of body with respect to the base frame.

The front frame member 11 has a front cross portion 15. The front cross portion 15 is coupled between the front arm portions 14 whereby the front cross portion 15 is for inhibiting independent movement of one of the front arm portions 14 with respect to the other of the front arm portions 14. The front cross portion 15 of the front frame member 11 is designed for inhibiting flexing of the body of the vehicle with respect to the base frame of the vehicle.

The rear frame member 12 has a pair of rear arm portions 16. Each of the rear arm portions 16 is selectively coupled to one of the door frame assemblies 13. Each of the rear arm portions 16 is designed for extending along a fender of the body of the vehicle whereby the arm portions are for inhibiting twisting of the rear of body with respect to the base frame.

The rear frame member 12 has a rear cross portion 17. The rear cross portion 17 is coupled between the rear arm portions 16 whereby the rear cross portion 17 is for inhibiting independent movement of one of the rear arm portions 16 with respect to the other of the rear arm portions 16. The rear cross portion 17 of the rear frame member 12 is designed for inhibiting flexing of the body of the vehicle with respect to the base frame of the vehicle.

Each of the door frame assemblies 13 has a bracing member 18. The bracing member 18 of each of the door frame assemblies 13 is selectively coupled to the front frame member 11 and the rear frame member when the associated one of the doors is closed. The bracing member 18 is for rigidly joining the front frame member 11 and the rear frame member 12 whereby the bracing member 18 of each of the door frame assemblies 13 is designed for inhibiting flexing of the body of the vehicle with respect to the frame.

Each of the door frame assemblies 13 has a front insert member 19. The front insert member 19 is positioned at an end of the bracing member 18. The front insert member 19 is selectively insertable into a front insert depression 20 of the front frame member 11. The front insert member 19 is for maintaining alignment of the bracing member 18 of the associated one of the door frame assemblies 13 and the front frame member 11 when the doors of the vehicle is closed.

Each of the door frame assemblies 13 has a rear insert member 21. The rear insert member 21 is positioned opposite the front insert member 19. The rear insert member 21 is selectively insertable into a rear insert depression 22 of the rear frame member 12. The rear insert member 21 is for maintaining alignment of the bracing member 18 of the associated one of the door frame assemblies 13 and the rear frame member 12 when the doors of the vehicle is closed.

The bracing member 18 of each of the door frame assemblies 13 has a lumen 23. The front insert member 19 and the rear insert member 21 are slidably positioned in the lumen 23 of the associated one of the door frame assemblies 13.

Each of the door frame assemblies 13 has an actuation assembly 24. The actuation assembly 24 is positioned in the lumen 23 of the bracing member 18. The actuation assembly 24 is coupled between the front insert member 19 and the rear insert member 21. The actuation assembly 24 is for retracting the front insert member 19 and the rear insert member 21 into the lumen 23 of the bracing member 18 when the associated one of the doors of the vehicle is opened. The actuation assembly 24 is for forcing the front insert member 19 into the front insert depression 20 and the rear insert member 21 into the rear insert depression 22 when the associated one of the doors of the vehicle is closed.

The actuation assembly 24 comprises a hydraulic ram 25. The hydraulic is positioned within the lumen 23 of the brace member. The hydraulic ram 25 has a base portion 26 and a ram portion 27. The ram portion 27 is selectively extendable from the base portion 26. The base portion 26 is coupled to the front insert member 19. The ram portion 27 is coupled to the rear insert member 21.

A hydraulic pump assembly 28 is operationally coupled to the base portion 26 of the hydraulic ram 25. The hydraulic pump is designed for being operationally coupled to an electrical system of the vehicle for supplying power to the hydraulic pump when the doors of the vehicle has been opened and closed. The hydraulic pump assembly 28 is designed for circulating hydraulic fluid through base portion 26 of the hydraulic ram 25 for forcing the front insert member 19 into the front insert depression 20 of the front frame member 11 and the rear insert member 21 into the rear insert depression 22 of the rear frame member 12 when the doors of the vehicle is closed. The hydraulic pump assembly 28 is designed for circulating hydraulic fluid through the base portion 26 of the hydraulic ram 25 for retracting the front insert member 19 from the front insert depression 20 of the front frame member 11 and the rear insert member 21 from the rear insert depression 22 of the rear frame member 12 when the doors of the vehicle is opened.

In an embodiment, the actuation assembly 24 comprises a motor member 29. The motor member 29 is designed for being operationally coupled to an electrical system of the vehicle whereby the electrical system is for supplying power to the motor member 29 when the doors of the vehicle are opened and closed. A rod portion 30 is engaged by the motor member 29 whereby the motor member 29 is for rotating the rod portion 30. The first insert member is operationally coupled to a first end 31 of the rod member whereby rotation of the rod portion 30 in a first direction forces the first insert member into the front insert depression 20 of the front frame member 11 when the doors of the vehicle is closed. The rod portion 30 is rotated in a second direction for retracting the front insert member 19 from the front insert depression 20 when the doors of the vehicle is opened. The rear insert member 21 is operationally coupled to a second end 32 of the rod member whereby rotation of the rod portion 30 in the first direction forces the rear insert member 21 into the rear insert depression 22 of the rear frame member 12 when the doors of the vehicle is closed. The rod portion 30 is rotated in the second direction for retracting the rear insert member 21 from the rear insert depression 22 when the doors of the vehicle is opened.

In use, the user opens the door of the vehicle and the front insert member 19 and rear insert member 21 are retracted to allow the door the be opened. The user then closes the door and the front insert member 19 and the rear insert member 21 are extended into the front insert depression 20 and the rear insert depression 22 respectively, which rigidly couples the front frame member 11 to the rear frame. The front frame member 11 and the rear frame member 12 then act in unity to reduce the flexing of the body with respect to base frame, especially in convertible vehicle where rigidity of the body is lost due to the lack of a rigid roof.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A expandable ram system for stiffening the body of a vehicle, the expandable ram system comprising:

a plurality of door frame assemblies being adapted for selectively coupling to the front and the rear of the body of the vehicle, each of said door frame assemblies being adapted for being positioned in one of plurality of doors of the body of the vehicle, said door frame assemblies being adapted for rigidly connecting the front of the body to the rear of the body for preventing flex in the body of the vehicle when the doors of the vehicle are closed;

each of said door frame assemblies having a bracing member, said bracing member of each of said door frame assemblies being adapted for selectively coupling to the front the rear of the body when the associated one of the doors is closed, said bracing member being for rigidly joining the front and the rear of the body such that said bracing member of each of said door frame assemblies is adapted for inhibiting flexing of the body of the vehicle with respect to the frame;

each of said door frame assemblies having a front insert member, said front insert member being positioned at an end of said bracing member, said front insert member being adapted for being selectively insertable into the front of the body, said front insert member being adapted for maintaining alignment of said bracing member of the associated one of said door frame assemblies and the front of the body when the doors of the vehicle is closed;

each of said door frame assemblies having a rear insert member, said rear insert member being positioned opposite said front insert member, said rear insert member being adapted for being selectively insertable into the rear of the body of the vehicle, said rear insert member being adapted for maintaining alignment of said bracing member of the associated one of said door frame assemblies and the rear of the body when the doors of the vehicle is closed;

said bracing member of each of said door frame assemblies having a lumen, said front insert member and said rear insert member being slidably positioned in said lumen of the associated one of said door frame assemblies; and each of said door frame assemblies having an actuation assembly, said actuation assembly being positioned in said lumen of said bracing member, said actuation assembly being coupled between said front insert member and said rear insert member, said actuation assembly being for retracting said front insert member and said rear insert member into said lumen of said bracing member when the associated one of the doors of the vehicle is opened, said actuation assembly being for forcing said front insert member into the front of the body and said rear insert member into the rear of the body when the associated one of the doors of the vehicle is closed.

2. The expandable ram system as set forth in claim 1, further comprising:

a front frame member selectively engaging said door frame assemblies, said front frame member being adapted for being coupled to a front of a body of the vehicle, said front frame member being adapted for being positioned above a base frame of the vehicle such that said front frame member is for stiffening the front of the body of the vehicle; and a rear frame member selectively engaging said door frame assemblies, said rear frame member being adapted for being coupled to a rear of the body of the vehicle, said rear frame member being adapted for being positioned above the base frame of the vehicle such that said rear frame member is for stiffening the rear of the body of the vehicle.

3. The expandable ram system as set forth in claim 2, further comprising:

said front frame member having a pair of front arm portions, each of said front arm portions being selectively coupled to one of said door frame assemblies, each of said front arm portions being adapted for extending along a fender of the body of the vehicle such that said arm portions are for inhibiting twisting of the front of body with respect to the base frame.

4. The expandable ram system as set forth in claim 3, further comprising:

said front frame member having a front cross portion, said front cross portion being coupled between said front arm portions such that said front cross portion is for inhibiting independent movement of one of said front arm portions with respect to the other of said front arm portions, said front cross portion of said front frame member being adapted for inhibiting flexing of the body of the vehicle with respect to the base frame of the vehicle.

5. The expandable ram system as set forth in claim 2, further comprising:

said rear frame member having a pair of rear arm portions, each of said rear arm portions being selectively coupled to one of said door frame assemblies, each of said rear arm portions being adapted for extending along a fender of the body of the vehicle such that said arm portions are for inhibiting twisting of the rear of body with respect to the base frame.

6. The expandable ram system as set forth in claim 5, further comprising:

said rear frame member having a rear cross portion, said rear cross portion being coupled between said rear arm portions such that said rear cross portion is for inhibiting independent movement of one of said rear arm portions with respect to the other of said rear arm portions, said rear cross portion of said rear frame member being adapted for inhibiting flexing of the body of the vehicle with respect to the base frame of the vehicle.

7. The expandable ram system as set forth in claim 1, further comprising:

said actuation assembly comprising a hydraulic ram, said hydraulic being positioned within said lumen of said brace member, said hydraulic ram having a base portion and a ram portion, said ram portion being selectively extendable from said base portion, said base portion being coupled to said front insert member, said ram portion being coupled to said rear insert member; and a hydraulic pump assembly being operationally coupled to said base portion of said hydraulic ram, said hydraulic pump being adapted for being operationally coupled to an electrical system of the vehicle for supplying power to said hydraulic pump when the doors of the vehicle has been opened and closed, said hydraulic pump assembly being adapted for circulating hydraulic fluid through base portion of said hydraulic ram for forcing said front insert member into the front of the body and said rear insert member into the rear of the body when the doors of the vehicle are closed, said hydraulic pump assembly being adapted for circulating hydraulic fluid through said base portion of said hydraulic ram for retracting said front insert member from the front of the body and said rear insert member from the rear of the body when the doors of the vehicle are opened.

8. The expandable ram system as set forth in claim 1, further comprising:

said actuation assembly comprising a motor member, said motor member being adapted for being operationally coupled to an electrical system of the vehicle such that the electrical system is for supplying power to said motor member when the doors of the vehicle are opened and closed, a rod portion being engaged by said motor member such that said motor member is for rotating said rod portion, said first insert member being operationally coupled to a first end of said rod member such that rotation of said rod portion in a first direction forces said first insert member into the front of the body when the doors of the vehicle are closed, said rod portion being rotated in a second direction for retracting said front insert member from the front of the body when the doors of the vehicle are opened, said rear insert member being operationally coupled to a second end of said rod member such that rotation of said rod portion in said first direction forces said rear insert member into the rear of the body when the doors of the vehicle are closed, said rod portion being rotated in said second direction for retracting said rear insert member from the rear of the body when the doors of the vehicle are opened.

9. A expandable ram system for stiffening the body of a vehicle, the expandable ram system comprising:

a front frame member being adapted for being coupled to a front of a body of the vehicle, said front frame member being adapted for being positioned above a base frame of the vehicle such that said front frame member is for stiffening the front of the body of the vehicle;

a rear frame member being adapted for being coupled to a rear of the body of the vehicle, said rear frame member being adapted for being positioned above the base frame of the vehicle such that said rear frame member is for stiffening the rear of the body of the vehicle;

a plurality of door frame assemblies selectively coupling to said front frame member and said rear frame member, each of said door frame assemblies being adapted for being positioned in one of plurality of doors of the body of the vehicle, said door frame assemblies rigidly connecting said front frame member to said rear frame member for preventing flex in the body of the vehicle when the doors of the vehicle are closed;

said front frame member having a pair of front arm portions, each of said front arm portions being selectively coupled to one of said door frame assemblies, each of said front arm portions being adapted for extending along a fender of the body of the vehicle such that said arm portions are for inhibiting twisting of the front of body with respect to the base frame;

said front frame member having a front cross portion, said front cross portion being coupled between said front arm portions such that said front cross portion is for inhibiting independent movement of one of said front arm portions with respect to the other of said front arm portions, said front cross portion of said front frame member being adapted for inhibiting flexing of the body of the vehicle with respect to the base frame of the vehicle;

said rear frame member having a pair of rear arm portions, each of said rear arm portions being selectively coupled to one of said door frame assemblies, each of said rear arm portions being adapted for extending along a fender of the body of the vehicle such that said arm portions are for inhibiting twisting of the rear of body with respect to the base frame;

said rear frame member having a rear cross portion, said rear cross portion being coupled between said rear arm portions such that said rear cross portion is for inhibiting independent movement of one of said rear arm portions with respect to the other of said rear arm portions, said rear cross portion of said rear frame member being adapted for inhibiting flexing of the body of the vehicle with respect to the base frame of the vehicle;

each of said door frame assemblies having a bracing member, said bracing member of each of said door frame assemblies being selectively coupled to said front frame member and said rear frame member when the associated one of the doors is closed, said bracing member being for rigidly joining said front frame member and said rear frame member such that said bracing member of each of said door frame assemblies is adapted for inhibiting flexing of the body of the vehicle with respect to the frame;

each of said door frame assemblies having a front insert member, said front insert member being positioned at an end of said bracing member, said front insert member being selectively insertable into a front insert depression of said front frame member, said front insert member being for maintaining alignment of said bracing member of the associated one of said door frame assemblies and said front frame member when the doors of the vehicle is closed;

each of said door frame assemblies having a rear insert member, said rear insert member being positioned opposite said front insert member, said rear insert member being selectively insertable into a rear insert depression of said rear frame member, said rear insert member being for maintaining alignment of said bracing member of the associated one of said door frame assemblies and said rear frame member when the doors of the vehicle is closed;

said bracing member of each of said door frame assemblies having a lumen, said front insert member and said rear insert member being slidably positioned in said lumen of the associated one of said door frame assemblies;

each of said door frame assemblies having an actuation assembly, said actuation assembly being positioned in said lumen of said bracing member, said actuation assembly being coupled between said front insert member and said rear insert member, said actuation assembly being for retracting said front insert member and said rear insert member into said lumen of said bracing member when the associated one of the doors of the vehicle is opened, said actuation assembly being for forcing said front insert member into said front insert depression and said rear insert member into said rear insert depression when the associated one of the doors of the vehicle is closed;

said actuation assembly comprising a hydraulic ram, said hydraulic ram being positioned within said lumen of said brace member, said hydraulic ram having a base portion and a ram portion, said ram portion being selectively extendable from said base portion, said base portion being coupled to said front insert member, said ram portion being coupled to said rear insert member; and a hydraulic pump assembly being operationally coupled to said base portion of said hydraulic ram, said hydraulic pump being adapted for being operationally coupled to an electrical system of the vehicle for supplying power to said hydraulic pump when the doors of the vehicle has been opened and closed, said hydraulic pump assembly being adapted for circulating hydraulic fluid through base portion of said hydraulic ram for forcing said front insert member into said front insert depression of said front frame member and said rear insert member into said rear insert depression of said rear frame member when the doors of the vehicle is closed, said hydraulic pump assembly being adapted for circulating hydraulic fluid through said base portion of said hydraulic ram for retracting said front insert member from said front insert depression of said front frame member and said rear insert member from said rear insert depression of said rear frame member when the doors of the vehicle is opened.

10. A expandable ram system for stiffening the body of a vehicle, the expandable ram system comprising:

a plurality of door frame assemblies being adapted for selectively coupling to the front and the rear of the body of the vehicle, each of said door frame assemblies being adapted for being positioned in one of plurality of doors of the body of the vehicle, said door frame assemblies being adapted for rigidly connecting the front of the body to the rear of the body for preventing flex in the body of the vehicle when the doors of the vehicle are closed;

a front frame member selectively engaging said door frame assemblies, said front frame member being adapted for being coupled to a front of a body of the vehicle, said front frame member being adapted for being positioned above a base frame of the vehicle such that said front frame member is for stiffening the front of the body of the vehicle;

a rear frame member selectively engaging said door frame assemblies, said rear frame member being adapted for being coupled to a rear of the body of the vehicle, said rear frame member being adapted for being positioned above the base frame of the vehicle such that said rear frame member is for stiffening the rear of the body of the vehicle;

each of said door frame assemblies having a bracing member, said bracing member of each of said door frame assemblies being selectively coupled to said front frame member and said rear frame member when the associated one of the doors is closed, said bracing member being for rigidly joining said front frame member and said rear frame member such that said bracing member of each of said door frame assemblies is adapted for inhibiting flexing of the body of the vehicle with respect to the frame;

each of said door frame assemblies having a front insert member, said front insert member being positioned at an end of said bracing member, said front insert member being selectively insertable into a front insert depression of said front frame member, said front insert member being for maintaining alignment of said bracing member of the associated one of said door frame assemblies and said front frame member when the doors of the vehicle is closed;

each of said door frame assemblies having a rear insert member, said rear insert member being positioned opposite said front insert member, said rear insert member being selectively insertable into a rear insert depression of said rear frame member, said rear insert member being for maintaining alignment of said bracing member of the associated one of said door frame assemblies and said rear frame member when the doors of the vehicle is closed;

said bracing member of each of said door frame assemblies having a lumen, said front insert member and said rear insert member being slidably positioned in said lumen of the associated one of said door frame assemblies; and each of said door frame assemblies having an actuation assembly, said actuation assembly being positioned in said lumen of said bracing member, said actuation assembly being coupled between said front insert member and said rear insert member, said actuation assembly being for retracting said front insert member and said rear insert member into said lumen of said bracing member when the associated one of the doors of the vehicle is opened, said actuation assembly being for forcing said front insert member into said front insert depression and said rear insert member into said rear insert depression when the associated one of the doors of the vehicle is closed.

11. The expandable ram system as set forth in claim 10, further comprising:

said front frame member having a pair of front arm portions, each of said front arm portions being selectively coupled to one of said door frame assemblies, each of said front arm portions being adapted for extending along a fender of the body of the vehicle such that said arm portions are for inhibiting twisting of the front of body with respect to the base frame.

12. The expandable ram system as set forth in claim 11, further comprising:

said front frame member having a front cross portion, said front cross portion being coupled between said front arm portions such that said front cross portion is for inhibiting independent movement of one of said front arm portions with respect to the other of said front arm portions, said front cross portion of said front frame member being adapted for inhibiting flexing of the body of the vehicle with respect to the base frame of the vehicle.

13. The expandable ram system as set forth in claim 10, further comprising:

said rear frame member having a pair of rear arm portions, each of said rear arm portions being selectively coupled to one of said door frame assemblies, each of said rear arm portions being adapted for extending along a fender of the body of the vehicle such that said arm portions are for inhibiting twisting of the rear of body with respect to the base frame.

14. The expandable ram system as set forth in claim 13, further comprising:

said rear frame member having a rear cross portion, said rear cross portion being coupled between said rear arm portions such that said rear cross portion is for inhibiting independent movement of one of said rear arm portions with respect to the other of said rear arm portions, said rear cross portion of said rear frame member being adapted for inhibiting flexing of the body of the vehicle with respect to the base frame of the vehicle.

15. The expandable ram system as set forth in claim 10, further comprising:

said actuation assembly comprising a hydraulic ram, said hydraulic being positioned within said lumen of said brace member, said hydraulic ram having a base portion and a ram portion, said ram portion being selectively extendable from said base portion, said base portion being coupled to said front insert member, said ram portion being coupled to said rear insert member; and a hydraulic pump assembly being operationally coupled to said base portion of said hydraulic ram, said hydraulic pump being adapted for being operationally coupled to an electrical system of the vehicle for supplying power to said hydraulic pump when the doors of the vehicle has been opened and closed, said hydraulic pump assembly being adapted for circulating hydraulic fluid through base portion of said hydraulic ram for forcing said front insert member into said front insert depression of said front frame member and said rear insert member into said rear insert depression of said rear frame member when the doors of the vehicle is closed, said hydraulic pump assembly being adapted for circulating hydraulic fluid through said base portion of said hydraulic ram for retracting said front insert member from said front insert depression of said front frame member and said rear insert member from said rear insert depression of said rear frame member when the doors of the vehicle is opened.

16. The expandable ram system as set forth in claim 10, further comprising:

said actuation assembly comprising a motor member, said motor member being adapted for being operationally coupled to an electrical system of the vehicle such that the electrical system is for supplying power to said motor member when the doors of the vehicle is opened and closed, a rod portion being engaged by said motor member such that said motor member is for rotating said rod portion, said first insert member being operationally coupled to a first end of said rod member such that rotation of said rod portion in a first direction forces said first insert member into said front insert depression of said front frame member when the doors of the vehicle is closed, said rod portion being rotated in a second direction for retracting said front insert member from said front insert depression when the doors of the vehicle is opened, said rear insert member being operationally coupled to a second end of said rod member such that rotation of said rod portion in said first direction forces said rear insert member into said rear insert depression of said rear frame member when the doors of the vehicle is closed, said rod portion being rotated in said second direction for retracting said rear insert member from said rear insert depression when the doors of the vehicle is opened.

* * * * *